United States Patent
Kohara

(10) Patent No.: US 9,731,463 B2
(45) Date of Patent: Aug. 15, 2017

(54) RIGID INNER MOLD FOR FORMING TIRE, AND METHOD OF MANUFACTURING TIRE USING THE SAME

(71) Applicant: Sumitomo Rubber Industries, Ltd., Kobe-shi (JP)

(72) Inventor: Kei Kohara, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 0 days.

(21) Appl. No.: 15/119,993

(22) PCT Filed: Mar. 3, 2015

(86) PCT No.: PCT/JP2015/056151
§ 371 (c)(1),
(2) Date: Aug. 18, 2016

(87) PCT Pub. No.: WO2015/133452
PCT Pub. Date: Sep. 11, 2015

(65) Prior Publication Data
US 2017/0057188 A1   Mar. 2, 2017

(30) Foreign Application Priority Data

Mar. 7, 2014  (JP) ................................. 2014-045399

(51) Int. Cl.
*B29D 30/06*   (2006.01)
*B29D 30/12*   (2006.01)
*B29K 105/24*  (2006.01)

(52) U.S. Cl.
CPC .......... *B29D 30/0661* (2013.01); *B29D 30/12* (2013.01); *B29K 2105/246* (2013.01); *B29K 2905/00* (2013.01)

(58) Field of Classification Search
CPC ...... B29D 30/0661; B29D 30/12; B29C 33/76
(Continued)

(56) References Cited

U.S. PATENT DOCUMENTS 3,609,819 A * 10/1971 Searle ................ B29D 30/0629
425/22
5,269,669 A * 12/1993 Ladouce ............. B29D 30/0629
249/57
(Continued)

FOREIGN PATENT DOCUMENTS

JP        11-34062 A     2/1999
JP     2006-264018 A    10/2006
(Continued)

OTHER PUBLICATIONS

International Search Report Issued Jun. 2, 2015 in PCT/JP2015/056151 Filed Mar. 3, 2015.

*Primary Examiner* — James Mackey
(74) *Attorney, Agent, or Firm* — Oblon, McClelland, Maier & Neustadt, L.L.P.

(57) ABSTRACT

Provided is a rigid core for tire formation that limits the rubber stuck between inner mold segments in an inner mold segment while minimizing the occurrence of unevenness in the radial direction between inner mold segments that is caused by thermal expansion. A core main body 2 is divided into: a first inner mold segment 5A in which both circumferential end surfaces 5As are inclined radially inward in a direction in which the circumferential width increases; a second inner mold segment 5B that is arranged in an alternating manner with the inner mold segment 5A and in which both circumferential end surfaces 5Bs are inclined radially inward in a direction in which the circumferential width decreases; and a butting member 6 that is arranged between the first inner mold segment 5A and the second inner mold segment 5B. Young's modulus Ea of the butting member 6 is smaller than Young's modulus Eb of the first and second inner mold segments 5A and 5B.

15 Claims, 8 Drawing Sheets

(58) Field of Classification Search
USPC .................................................. 425/54, 55
See application file for complete search history.

(56) References Cited

U.S. PATENT DOCUMENTS

| | | | |
|---|---|---|---|
| 6,113,833 A | 9/2000 | Ogawa | |
| 9,039,399 B2* | 5/2015 | Kohara | B29D 30/12 |
| | | | 425/54 |
| 9,144,947 B2* | 9/2015 | Kohara | B29D 30/12 |
| 2010/0116439 A1 | 5/2010 | Lundell | |
| 2015/0030711 A1 | 1/2015 | Kohara | |

FOREIGN PATENT DOCUMENTS

| | | |
|---|---|---|
| JP | 2006-341438 A | 12/2006 |
| JP | 2011-161896 A | 8/2011 |
| JP | 2011-167979 A | 9/2011 |
| JP | 2013-184368 A | 9/2013 |
| JP | 2014-24306 A | 2/2014 |

\* cited by examiner

RIGID INNER MOLD FOR FORMING TIRE, AND METHOD OF MANUFACTURING TIRE USING THE SAME

TECHNICAL FIELD

In a rigid inner mold method, the present invention relates to a rigid inner mold for tire formation, and a method of manufacturing a tire using it which is capable of suppressing generation of a radial step between the inner mold segments due to thermal expansion while suppressing rubber stuck between inner mold segments.

BACKGROUND ART

In recent years, in order to improve an accuracy of forming a tire, a method of manufacturing the tire using a rigid inner mold (hereinafter it may be referred to as "a rigid inner mold method") has been proposed (e.g. see Patent Documents 1 and 2). The rigid inner mold comprises an inner mold body having an outer shape suiting a shape of a tire cavity surface of a vulcanized tire. Onto the inner mold body, tire structure members are sequentially attached so as to form a green tire. The green tire with the rigid inner mold is put into a vulcanizing metallic mold, and the green tire is vulcanized and molded.

As shown in FIG. 8 (A), in the rigid inner mold method, in order to extract an inner mold body (a) from the tire after vulcanization molding, the inner mold body (a) is divided into a plurality of inner mold segments (c) in the circumferential direction.

The inner mold segments (c) comprises first inner mold segments c1 where both of circumferential end surfaces are defined as first mating surfaces sc1 each having a small width in the circumferential direction, and second inner mold segments c2 where both of end surfaces are defined as second mating surfaces sc2 each having a large width in the circumferential direction. The first mating surface sc1 and the second mating surface sc2 which lie circumferentially next to each other are butted with each other, thereby the inner mold body (a) is formed as an annular shape.

The first mating surface sc1 is formed as an outward inclination surface inclined in the direction of which circumferential width increases toward the radial by inward. The second mating surface sc2 is formed as an inward inclination surface inclined in the direction of which circumferential width decreases toward the radial by inward. Thus, the segments can be taken out one by one by moving radially inwardly commencing with the first inner mold segment c1. That is, it makes possible to disassemble and to take out the inner mold body (a) from the tire.

However, a temperature of the inner mold body (a) rises from an ordinary temperatures state at a time of the green tire formation (about from 15 to 50° C.) to a high temperature state at a time of vulcanization (not less than 100° C.). Therefore, at the time of vulcanization, thermal expansion causes a pressing force between the inner mold segments c1 and c2 which lie next to each other in the circumferential direction. At this time, as shown in FIG. 8 (B), the first inner mold segment c1 which comprises the mating surface sc1 as an outward inclination surface is pushed out radially inward. The inner mold segment c2 which has the mating surface sc2 as an inward inclination is pushed out radially outward. As a result, the radial step (d) generates between the outer peripheral surfaces of the first and second inner mold segments c1 and c2, thereby causing a problem of reducing the uniformity of the tire.

To reduce the step (d), it is proposed to increase an interspace amount between the mating surfaces sc1 and sc2 at the ordinary temperatures state so as to reduce the pressing force during the vulcanization molding. However, this case leads to a decrease in the tire quality such as the rubber stuck cased by rubber flowing into the interspace during the vulcanization.

RELATED ART DOCUMENTS

Patent Literature

Patent Document 1: Japanese unexamined Patent Publication No. 2011-161896
Patent Document 2: Japanese Unexamined Patent Publication No. 2011-167979

SUMMARY OF THE INVENTION

Problems that the Invention is to Solve

In the present invention, it is an object of the present invention to provide a rigid inner mold for forming tire and a method of manufacturing tire using it which is capable of reducing the generation of the radial step between the first and second inner mold segments while reducing the rubber stuck.

Means for Solving the Problems

According to the present invention, a rigid inner mold comprising an annular inner mold body having a tire molding surface for forming a green tire and put into a vulcanizing metallic mold with the green tire so as to vulcanize the green tire between the vulcanizing metallic mold and the inner mold body. The inner mold body comprises a plurality of first inner mold segments having circumferential end surfaces inclined in the direction of which circumferential width increases toward the radially inward, a plurality of second inner mold segments having circumferential end surfaces inclined in the direction of which circumferential width decreases toward the radially inward and disposed alternately in the circumferential direction the first inner mold segments, and butting members disposed between the first inner mold segment and the second inner mold segment. And the butting members are fixed to one of the circumferential end surface of the adjacent first and second inner mold segments. Young's modulus Ea of the butting members is smaller than Young's modulus Eb of the first and second inner mold segments.

Effect of the Invention

As described above, in the present invention, the butting members are interposed between the first and second inner mold segments. Young's modulus Ea of the butting members is set to be smaller than Young's modulus Eb of the first and second inner mold segments. Accordingly, the pressing force between the inner mold segments generated by the thermal expansion during the vulcanization, can be absorbed mitigated by compressive deformation of the butting members. Therefore, it is possible to reduce the radial step generated between the first and second inner mold segments, and it can improve the uniformity of the tire.

Also the butting members are fixed to one of the first and second inner mold segments. Therefore, it is possible to maintain a disassembly efficiency of the inner mold body in the same level as conventional one. Also it is not necessary to widen the interspace between the butting member and the other inner mold segment, it is therefore also possible to suppress the generation of the rubber stuck.

DESCRIPTION OF THE INVENTION

Hereinafter, an embodiment of the present invention will be described in detail.

Figure 1:
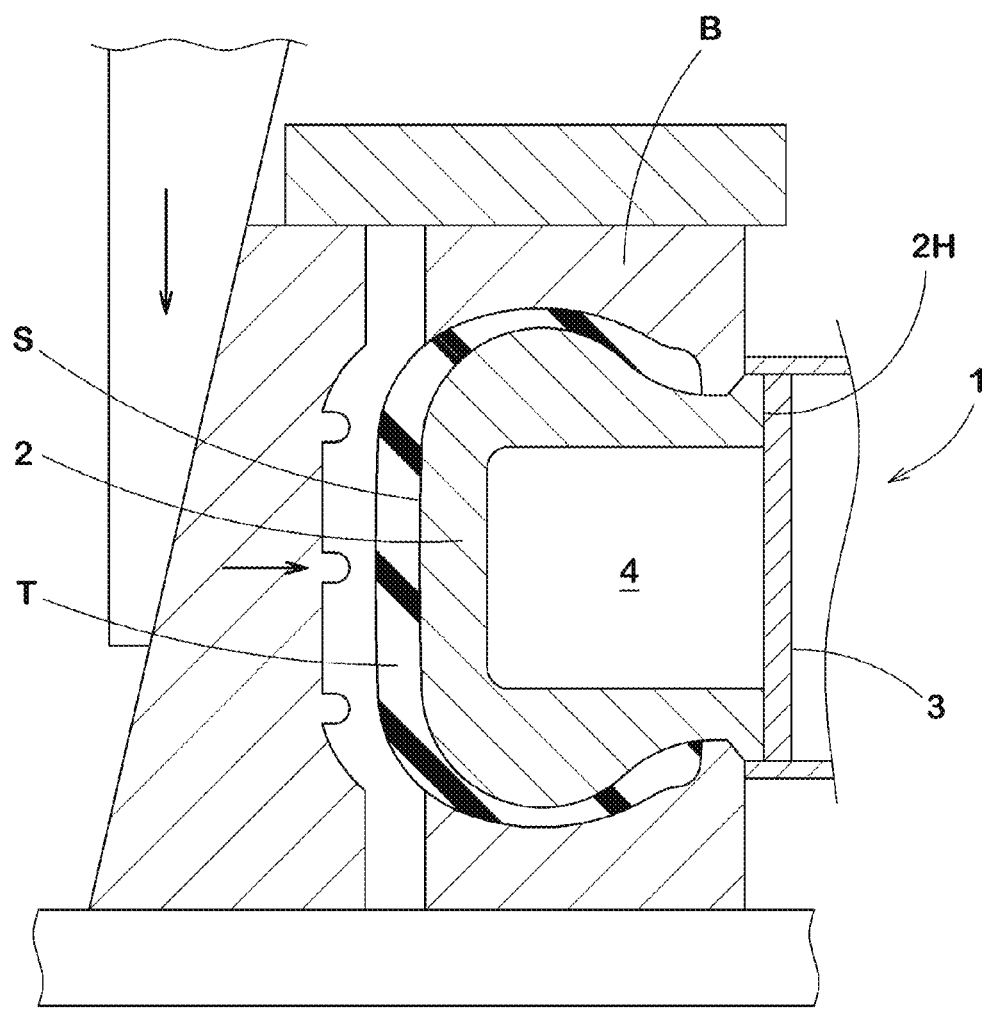
FIG. 1 is a cross-sectional view showing a vulcanization step in a tire manufacturing method of the present invention.

As shown in FIG. 1, a rigid inner mold 1 for forming a tire according to the present invention comprises an annular inner mold body 2 provided on an outer surface with a tire molding surface S. On this tire molding surface S, tire structure members such as a carcass ply, a belt ply, a sidewall rubber, a tread rubber are attached sequentially, thereby forming a green tire T having substantially the same shape as a finished tire. In addition, the green tire T with the rigid inner mold 1 is put into a vulcanizing metallic mold B, thereby vulcanizing the green tire T between the inner mold body 2 as an inner mold and the vulcanizing metallic mold B as an outer mold. The tire molding surface S is formed in substantially the same shape as an inner surface shape of the finished tire.

The rigid inner mold 1 comprises the inner mold body 2 and a cylindrical core 3 which is inserted into a center hole 2H of the inner mold body 2. Except for the inner mold body 2, conventional well-known structures can be employed. Therefore, in this specification, it will be described only the inner mold body 2 below.

The inner mold body 2 has a hollow shape comprising a cavity portion 4 extending continuously in the circumferential direction, for example. Inside the cavity portion 4, a heating means (not shown) such as an electric heater to heat inward the green tire T is disposed.

Figure 2A:
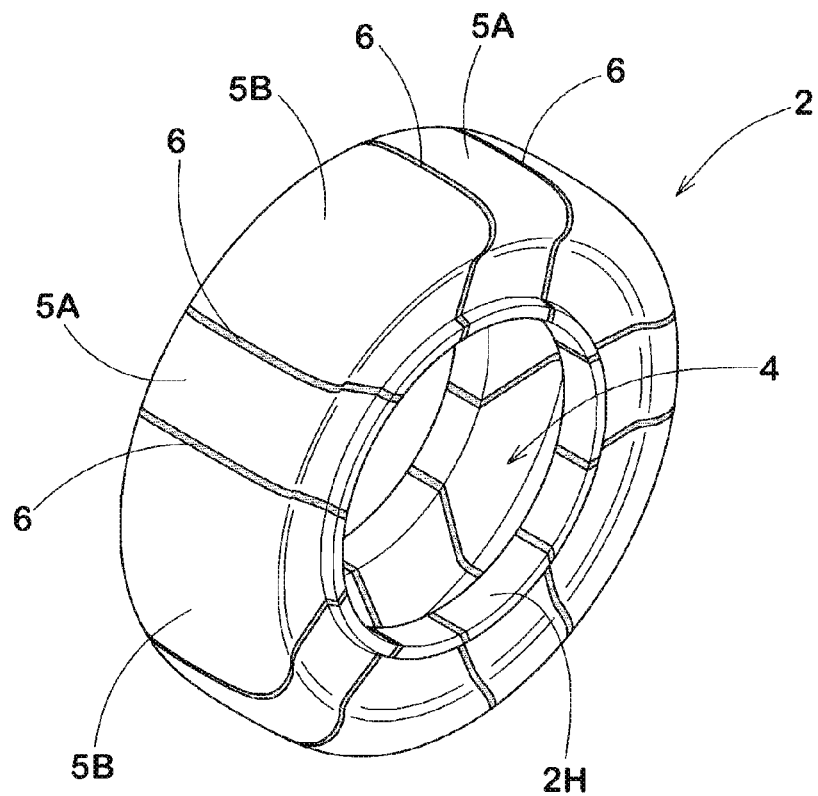
FIGS. 2 (A) and (B) are a perspective view of an inner mold body and a partial side view enlarging the part thereof.
Figure 2B:
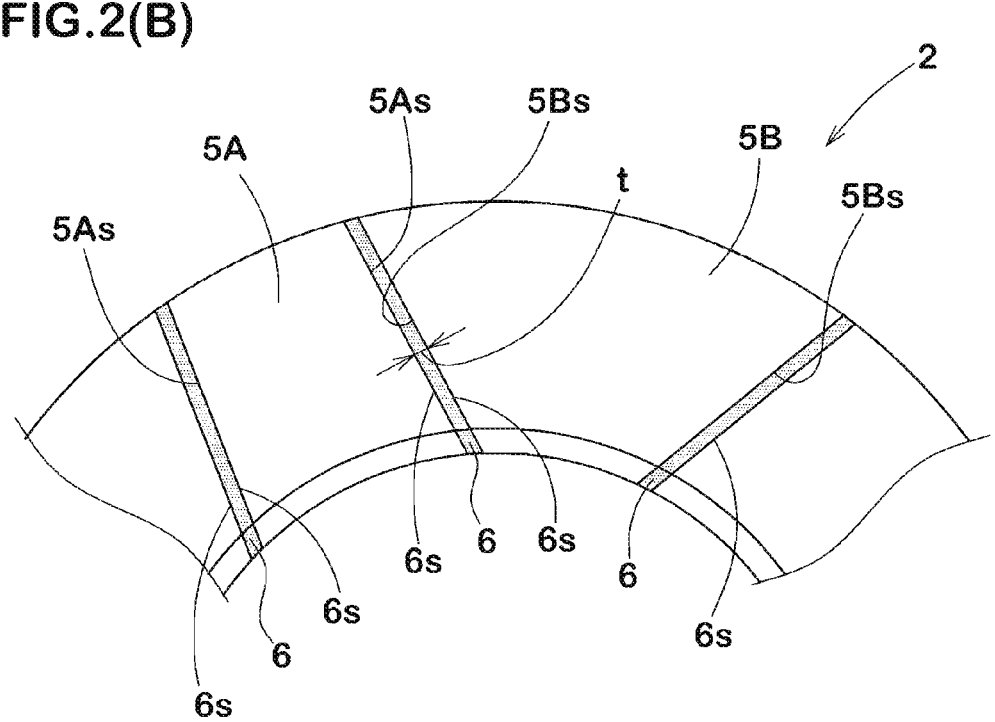

As shown in FIGS. 2 (A) and (B), the inner mold body 2 is divided into a plurality of the first and second inner mold segments 5A and 5B which are arranged alternately in the circumferential direction, and butting members 6 disposed therebetween. In each of the first inner mold segments 5A, the circumferential end surfaces 5As are inclined in a direction of a circumferential width increasing radially inward (sometimes referred to as "outward incline"). However, in each of the second inner mold segments 5B, the circumferential end surfaces 5Bs are inclined in a direction of a circumferential width decreasing radially inward (sometimes referred to as "inner incline"). And, the butting members 6 are plates where the circumferential end surfaces 6 are parallel to each other, i.e. its circumferential thickness (t) is substantially constant.

Figure 3A:
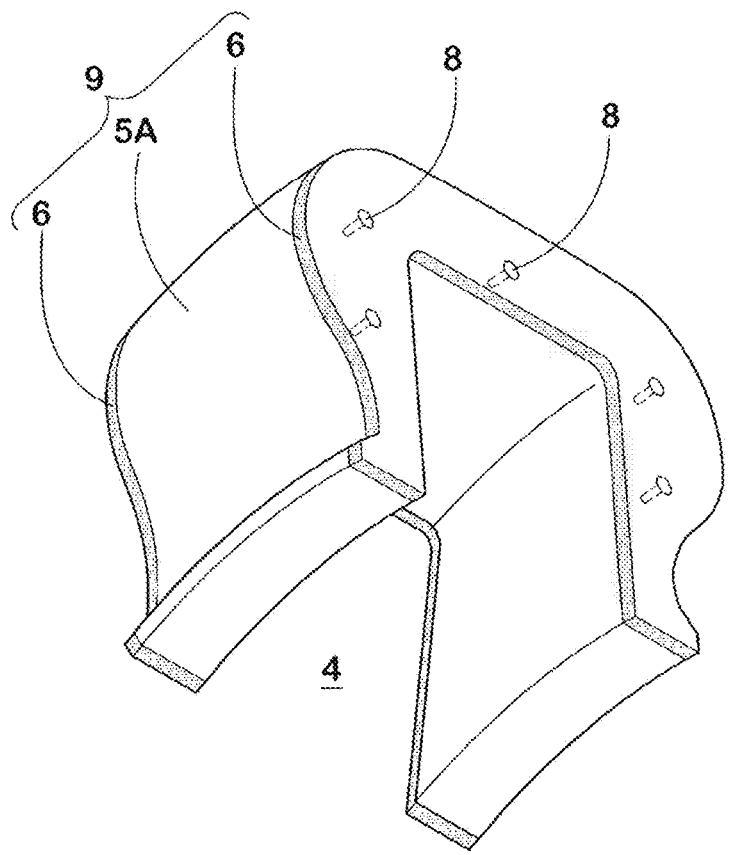
FIGS. 3 (A) and (B) are a perspective view and a side view showing a fixed state between butting members and one of inner mold segments.
Figure 3B:
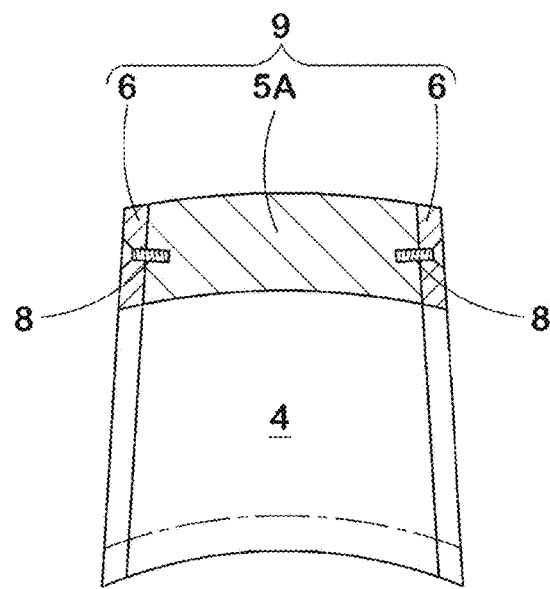

The butting members 6 are fixed to a circumferential end of one of the first and second inner mold segments 5A and 5B which lie next to each other. As shown in FIGS. 3 (A) and (B), in this example, each of the butting members 6 is fixed on the circumferential end surface 5As of the first inner mold segment 5A interchangeably fixed by use of a bis 8, for example. That is, in this embodiment, the first inner mold segment 5A is formed as a composite inner mold segment 9 which is joined integrally with the butting members 6 and 6.

Figure 4:
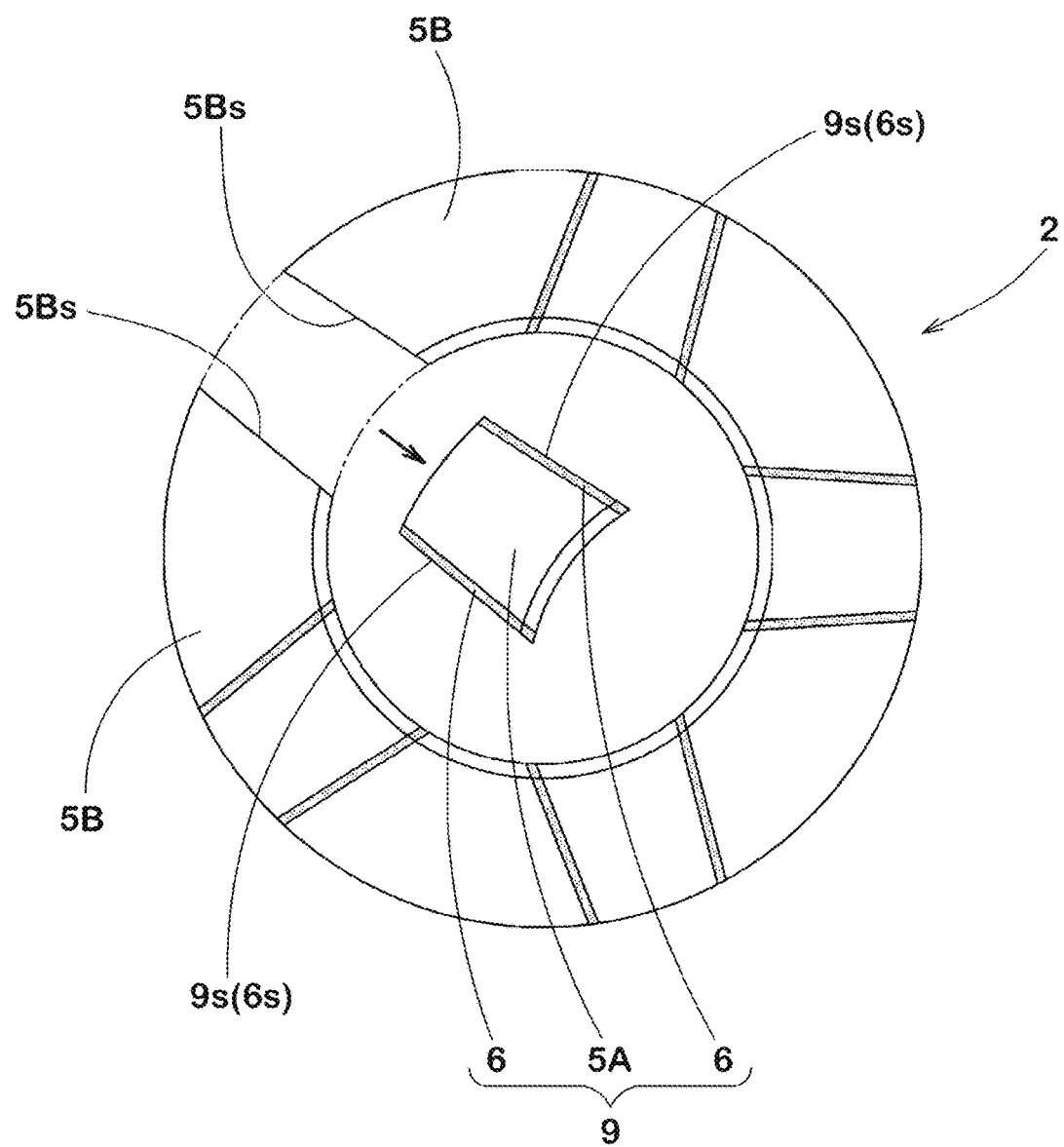
FIG. 4 is a side view illustrating disassembly of the inner mold body.

Thus, as shown in FIG. 4, in this embodiment, the circumferential end surface 9s of the composite inner mold segment 9 and the circumferential end face 5Bs of the second inner mold segment 5B are butted together, therefore the inner mold body 2 is assembled in an annular shape. Further, in the assembled inner mold body 2, it is possible to move sequentially from the composite inner mold segments 9 radially inward. That is, after the vulcanization molding, it is possible to be taken out in disassembling one by one sequentially commencing with the composite inner mold segment 9 from a bead hole. Note that the core 3 prevents that the respective inner mold segments 5A and 5B from moving radially inward and keeps the inner mold body 2 in the annular shape.

Next, the Young's modulus Ea of the butting member 6 is set to be smaller than Young's modulus Eb of each of the first and second inner mold segments 5A and 5B.

Figure 8A:
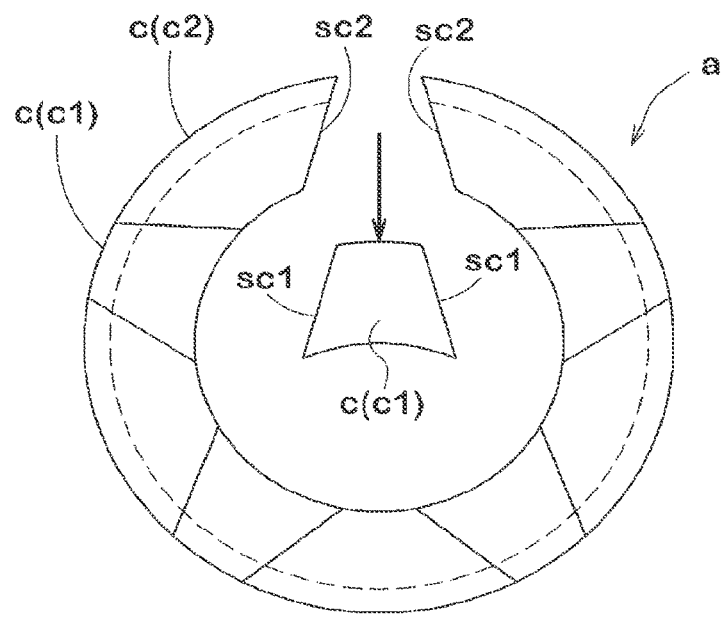
FIG. 8 (A) is a side view of a conventional inner mold body, and FIG. 8 (B) is a side view showing enlargedly a state of occurrence of a step.
Figure 8B:
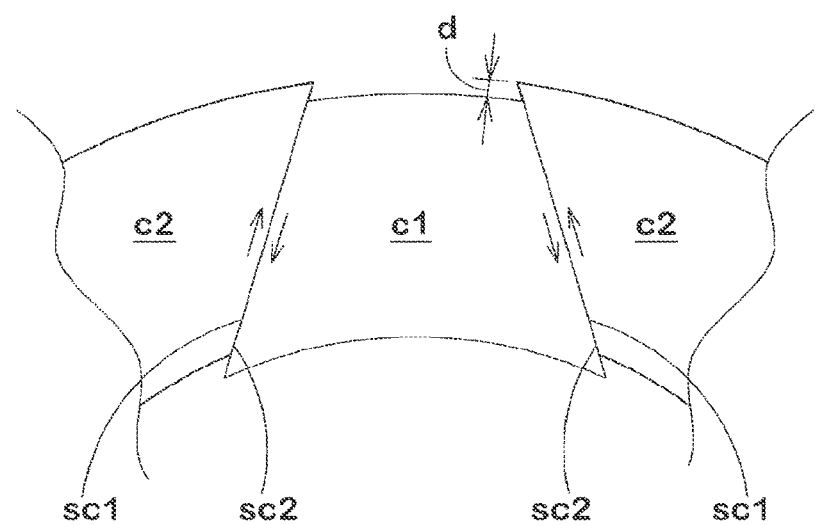

The radial step (d) (illustrated in FIG. 8 (B)) between the first and second inner mold segments 5A and 5B due to thermal expansion generates as follows: Owing to the vulcanization heat during the vulcanization molding, the thermal expansion is also generated in the circumferential direction as well as the radial direction. And due to this thermal expansion in the circumferential direction, a pressing force in the circumferential direction acts on the circumferential end surfaces 5As and 5Bs of the first and second inner mold segments 5A and 5B. At this time, the circumferential end surfaces 5As and 5Bs are inclined outward and inward, respectively. As a result, the first inner mold segment 5A inclined outward is pushed radially inward and shifted. The second inner mold segment 5B inclined inward is pushed radially outward and shifted. This shifting generates the step (d). Also, the higher the press pressure in the circumferential direction is, the larger the step (d) is.

In the present invention, the butting member 6 having the small Young's modulus Ea is interposed between the first and second inner mold segments 5A and 5B. Thus, the press pressure onto the inner mold segments 5A and 5B generated by the thermal expansion in the circumferential direction can be absorbed by a compressive deformation of the butting member 6.

Figure 5:
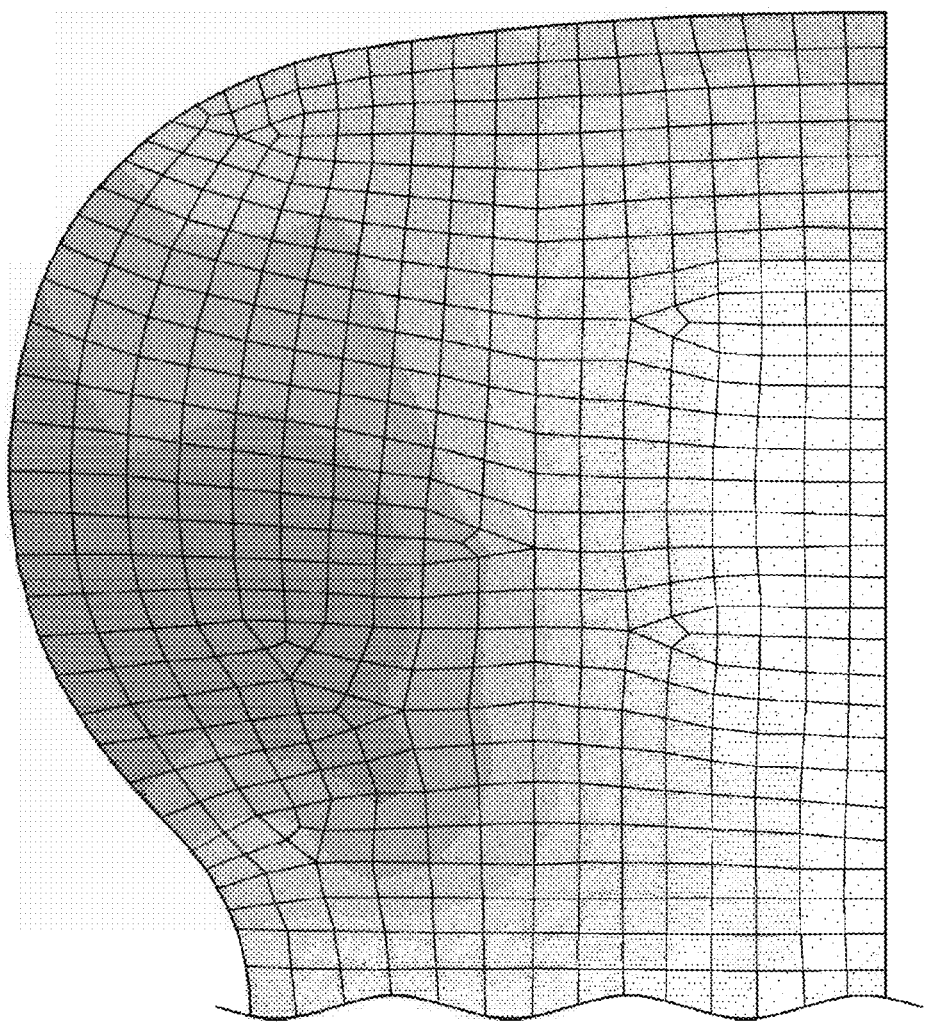
FIG. 5 is a distribution chart of pressure in a circumferential end surface of the inner mold segment.

On the other hand, the inner mold body 2 thermally expands complexly since the inner mold body 2 is formed in substantially the same shape as the interior shape of the finished tire. That is, at a time of production of the inner mold segments 5A and 5B, also at a time of processing each of the circumferential end surfaces 5As and 5Bs into the flat at the ordinary temperatures state, each of the circumferential end surfaces 5As and 5Bs is deformed into a curved shape in the vulcanization temperature state. Therefore, distribution of pressing force is uneven. FIG. 5 shows an example of the distribution of the pressing force when no butting member 6 is provided. FIG. 5 is a distribution chart of the pressing force between the circumferential end face 5As and 5Bs at the vulcanization temperature (150° c.). The inner mold body 2 is made from aluminum (The cavity portion 4 is not formed.). The inner mold body 2, at the ordinary temperature (20° C.), has the circumferential end surfaces 5As and 5Bs in the flat and having an interval of 0.07 mm (constant) between the end surfaces 5As and 5Bs. It indicates that the larger the pressure is, the darker the color is.

Figure 6:
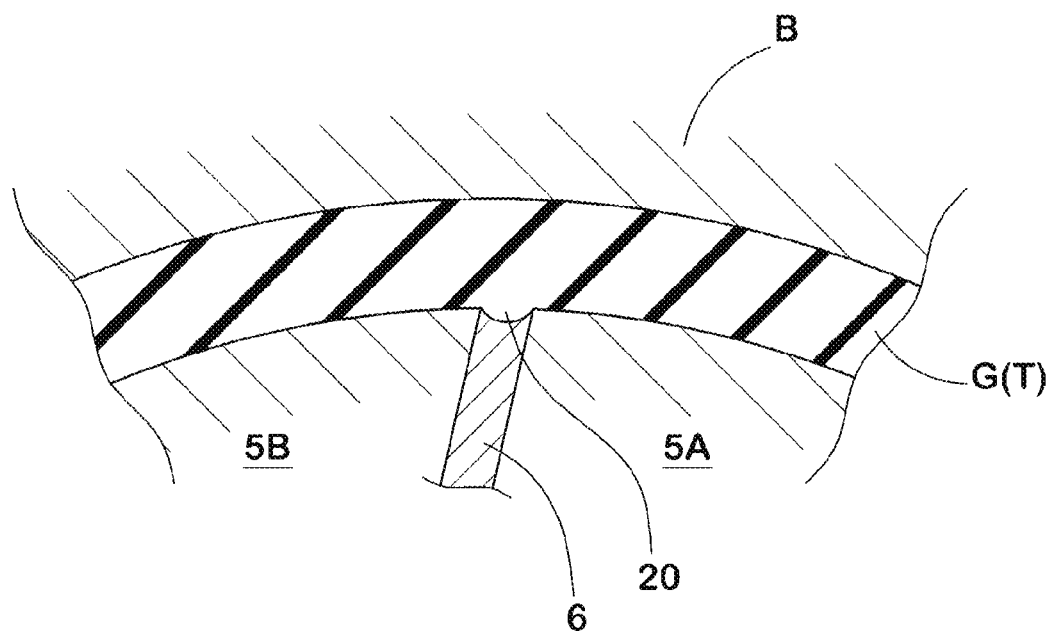
FIG. 6 is a cross-sectional view illustrating a convex mark generated on the inner surface of the vulcanized tire due to butting members.

Since of the distribution of this pressing force is uneven, when the butting member 6 is interposed, the distribution of the compressive deformation is also uneven. Therefore, when the circumferential thickness (t) of the butting member 6 is too thin, a ratio of compressive strain to the thickness (t) is excessive, and it tends to damage the butting member 6. From this point of view, the thickness (t) is preferably not less than 1.0 mm, more preferably not less than 4.0 mm. Also, as shown in FIG. 6, when the thickness (t) of the butting member 6 is too thick, the radially outer end face of the butting member 6 is pushed by the pressure of the rubber G in vulcanization and gets dented radially inward more than the tire forming surface S. As a result, a convex mark 20 is generated on the inner surface of the vulcanized tire T, and it leads to tendency of quality loss of the tire. From this point of view, the thickness (t) is preferably not more than 10.0 mm, more preferably not more than 6.0 mm.

Also, the Young's modulus Ea of the butting member 6 is preferably not more than 10% of the Young's modulus Eb of each of the first and second inner mold segments 5A and 5B. If the Young's modulus Ea exceeds 10% of the Young's modulus Eb, the absorption effect of the pressing pressure by the butting member 6 is small, and it is difficult to sufficiently suppress the step (d) between the first and second inner mold segments 5A and 5B.

A ratio Ea/Eb is a ratio between the Young's modulus Ea and the Young's modulus Eb. The smaller the ratio Ea/Eb is, the better from the viewpoint of the suppressive effect of the step (d). However, if the Young's modulus Ea is too small, the butting member 6 gets dented in concave shape owing to the push of being pushed by the pressure of the rubber G during vulcanization, therefore it tends to lead to generate the convex mark 20 on the inner surface of the vulcanized tire T. However, if the Young's modulus Ea is too large, it is difficult to be deformed compressively, and a suppressive effect of the step (d) is deteriorate. From this point of view, a lower limit of the Young's modulus Ea is preferably not less than 0.1 GPa, more preferably not less than 0.4 GPa, and an upper limit is preferably not more than 2.0 GPa, more preferably not more than 1.0 GPa.

As a material of a conventional inner mold body, from the viewpoints of an endurance strength, handling property, energy efficiency and the like, lightweight metallic materials such as aluminum and its alloy (aluminum alloy) are generally used, for example. In the inner mold body 2 of the present invention, from the same viewpoints, as a material of the first and second inner mold segments 5A and 5B, the lightweight metallic materials such as aluminum and its alloy (aluminum alloy) are preferably used, for example.

However, as the butting member 6, heat-resisting synthetic resin materials such as silicone resin (silicone rubber), allyl resins, polyamide-imide resin, fluorine resin, polyphenylene sulfide resin (PPS), polyethylene terephthalate resin (PET) and the like are preferably used, for example. Table 1 shows an example of the Young's modulus. As shown in the Table, the material having the Young's modulus Ea ranging from 0.1 to 2.0 GPa includes fluorine resin and allyl resin.

TABLE 1

| <Heat-resisting synthetic resin> | Young's modulus Ea (GPa) |
|---|---|
| Silicone resin (silicone rubber) | 0.04 |
| Allyl resin | 1.9 |
| Polyamide-imide resin (PAI) | 4.5 |
| Fluorine resin (PTFE, PFA, FEPETFE etc.) | 0.40-0.60 |
| Polyphenylene sulfide resin (PPS) | 3.3 |
| Polyethylene terephthalate resin (PET) | 2.8-4.2 |
| <Metal> | Young's modulus Eb (GPa) |
| Magnesium | 45 |
| Aluminium | 71 |
| Aluminium alloy | 69 |
| Copper | 110-130 |

Figure 7A:
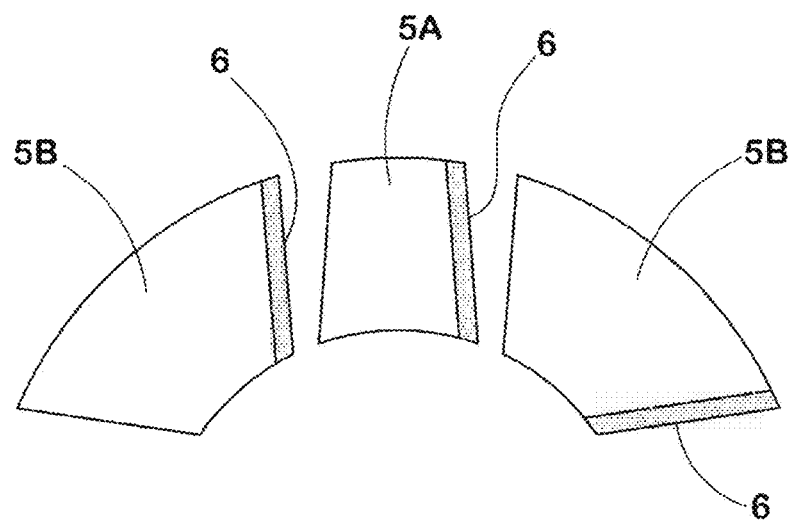
FIG. 7 (A) is a side view showing another example of fixing the butting members, and FIG. 7 (B) is a side view showing another example of the inner mold segment.
Figure 7B:
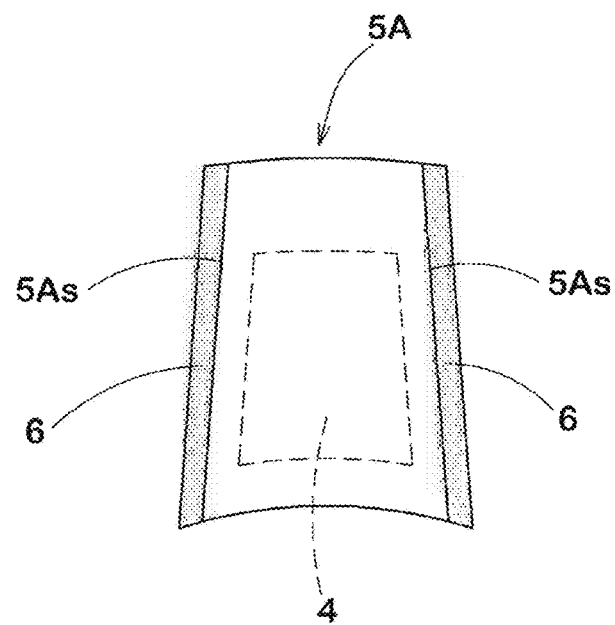

This embodiment illustrated a case that the butting member 6 was fixed to the circumferential both end surface 5As of the first inner mold segment 5A. However, the butting member 6 may be fixed to the circumferential both end surface 5Bs of the second inner mold segment 5B. As shown in FIG. 7 (A), the butting member 6 may be fixed to the end surface 5As on a circumferentially one side (right side in the drawing) of the first inner mold segment 5A and the end surface 5Bs on a circumferentially one side (right side in the drawing) of the second inner mold segment 5A, respectively.

Also in the inner mold body 2, the cavity portion 4 does not continuously extend in the circumferential direction. As a typical first inner mold segment 5A in FIG. 7 (B), it may be possible to form and close up it inside the inner mold segments 5A and 5B, i.e. to form it without opening the cavity portion 4 on the circumferential end faces 5As and 5Bs and the inner peripheral surface. In this case, as the heating means, it is possible to employ a heated fluid such as steam, and the heated fluid flows into each of the cavity portion 4.

Next, a manufacturing method of the tire comprises a green tire forming step and a vulcanizing step. In the green tire forming step, tire structure members such as a carcass ply, a belt ply, a sidewall rubber, a tread rubber are sequentially attached on the tire forming surface S of the rigid inner mold 1, thereby forming the green tire T. In the vulcanizing step as shown in FIG. 1, the green tire T obtained in the green tire forming step is put into the vulcanizing metallic mold B with the rigid inner mold 1, and the vulcanization molding is performed.

The above has described in detail a particularly preferred embodiment of the present invention, the present invention is not limited to the embodiments shown, may be employed upon modifying the same into various forms.

EXAMPLE

In order to confirm an effect of the present invention, an inner mold body 2 for a pneumatic tire having a tire size 195/65R15 was made as a trial model in specifications of the structure shown in FIG. 2 and Table 2. And when forming the pneumatic tire by use of the inner mold body 2, it was evaluated in generation status of a radial step (d) (shown in FIG. 8 (B)) between inner mold segments 5A and 5B, in generation status of a convex mark 20 (shown in FIG. 6) at a butting position, in generation status of rubber stuck at the butting position, and in maintenance property.

As the first and second inner mold segments 5A and 5B, aluminum (Young's modulus Ea=71 GPa; thermal expansion coefficient=2.38×10⁻⁵/degree) is used Also as butting members 6, heat-resistant synthetic resin according to Table 1 is used. A temperature of inner mold body 2 at a time of forming the green tire is 20° C., and a temperature of the inner mold body 2 during vulcanization is 150° C. Also an interspace between the butting surfaces at 20° C. is 0.15 mm. Except those shown in Table 2 are substantially the same.

(1) Generation Status of Step:

When the inner mold body was heated to 150° C., the radial step between the first and second inner mold segments were measured. The measured figure was evaluated by index. The smaller the measured figure is, the better because the step is small.

(2) Generation Status of Convex Mark:

An inner surface of the tire after vulcanization molding was observed, and a product of a width and a height of the convex mark at the butting position was quantified and evaluated in index. The smaller the numerical number is, the better because the convex mark is small. Note that the evaluation was carried out initially (the first tire).

(3) Generation Status of Rubber Stuck:

The inner surface of the tire after vulcanization molding was observed, and the amount of rubber stuck at the butting position was quantified and evaluated in index. The smaller the numerical number is, the better because the rubber stuck is small. Note that the evaluation was carried out initially (the first tire).

(4) Maintenance Property:

By use of the inner mold body, the tires were formed at a rate of 150 pieces per day for 100 days (15000 tires). At that time, the number of replacements due to damage of the butting members was quantified and evaluated in index. The smaller the numerical number is, the better because the number of change is smaller.

TABLE 2

|  | Ref. Ex. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Butting member | None | PTFE | PTFE | PTFE | PTFE | PTFE | PTFE | silicone rubber | silicone rubber |
| Young's modulus Ea |  |  |  |  |  |  |  |  |  |
| (Gpa) | — | 0.55 | 0.55 | 0.55 | 0.55 | 0.55 | 0.55 | 0.04 | 0.04 |
| (Ratio Ea/Eb) | — | (0.78%) | (0.78%) | (0.78%) | (0.78%) | (0.78%) | (0.78%) | (0.056%) | (0.056%) |
| Thickness t (mm) | 0.0 | 0.5 | 1.0 | 5.0 | 7.8 | 10.0 | 12.0 | 0.5 | 4.0 |
| Generation status of step | 4 | 3 | 1.2 | 1 | 1 | 1.2 | 2 | 1 | 1 |
| Generation status of convex mark | 1 | 1 | 1.2 | 2 | 3 | 4 | 4.5 | 2 | 3 |
| Generation status of step | 1 | 2 | 2 | 2 | 2 | 2 | 2 | 3 | 2 |
| Maintenance property | — | 8 | 5 | 3 | 2 | 1 | 1 | 10 | 8 |

As shown in Table, in Examples, it can be confirmed that the generation of radial step between the first and second inner mold segments can be suppressed while reducing the rubber stuck.

DESCRIPTION OF REFERENCE MARK

1 Rigid inner mold
2 Inner mold body
5A First inner mold segment
5B Second inner mold segment
6 Butting member
B vulcanizing metallic mold
S Tire molding surface
T Green tire

The invention claimed is:

1. A rigid inner mold, comprising:
an annular inner mold body comprising a plurality of first inner mold segments and a plurality of second inner mold segments positioned alternately with the first inner mold segments in the circumferential direction and having a tire molding surface configured to form a green tire, the annular inner mold body being configured to be put into a vulcanizing metallic mold with the green tire such that the green tire is vulcanized between the vulcanizing metallic mold and the annular inner mold body,
wherein the plurality of first inner mold segments has a plurality of circumferential end surfaces inclined in a direction of which circumferential width increases toward the radially inward, the plurality of second inner mold segments has a plurality of circumferential end surfaces inclined in a direction of which circumferential width decreases toward the radially inward the annular inner mold body comprises a plurality of butting members positioned between adjacent first inner mold segment and second inner mold segment such that the butting members are fixed to one of the circumferential end surfaces of the adjacent first and second inner mold segments, and the plurality of butting members has Young's modulus Ea which is smaller than Young's modulus Eb of the first and second inner mold segments.

2. The rigid inner mold for forming the tire according to claim 1, wherein each of the butting members has a circumferential thickness t which is in a range of from 1.0 to 10.0 mm.

3. The rigid inner mold for forming the tire according to claim 1, wherein the Young's modulus Ea of the butting members is not more than 10% of the Young's modulus Eb of the first and second inner mold segments.

4. The rigid inner mold for forming the tire according to claim 1, wherein the Young's modulus Ea of the butting members is in a range of from 0.1 to 2.0 GPa.

5. A method of manufacturing a tire, comprising:
attaching sequentially a plurality of tire structure members onto the tire molding surface of the annular inner mold body of the rigid inner mold according to claim 1 such that the green tire is obtained;
putting the green tire into the vulcanizing metallic mold with the rigid inner mold; and
vulcanizing the green tire between the vulcanizing metallic mold and the annular inner mold body.

6. The rigid inner mold for forming the tire according to claim 2, wherein the Young's modulus Ea of the butting members is not more than 10% of the Young's modulus Eb of the first and second inner mold segments.

7. The rigid inner mold for forming the tire according to claim 2, wherein the Young's modulus Ea of the butting members is in a range of from 0.1 to 2.0 GPa.

8. A method of manufacturing a tire, comprising:
attaching sequentially a plurality of tire structure members onto the tire molding surface of the annular inner mold body of the rigid inner mold according to claim 2 such that the green tire is obtained;
putting the green tire into the vulcanizing metallic mold with the rigid inner mold; and
vulcanizing the green tire between the vulcanizing metallic mold and the annular inner mold body.

9. The rigid inner mold for forming the tire according to claim 3, wherein the Young's modulus Ea of the butting members is in a range of from 0.1 to 2.0 GPa.

10. A method of manufacturing a tire, comprising:
attaching sequentially a plurality of tire structure members onto the tire molding surface of the annular inner mold body of the rigid inner mold according to claim 3 such that the green tire is obtained;
putting the green tire into the vulcanizing metallic mold with the rigid inner mold; and
vulcanizing the green tire between the vulcanizing metallic mold and the annular inner mold body.

11. A method of manufacturing a tire, comprising:
attaching sequentially a plurality of tire structure members onto the tire molding surface of the annular inner mold body of the rigid inner mold according to claim 4 such that the green tire is obtained;
putting the green tire into the vulcanizing metallic mold with the rigid inner mold; and
vulcanizing the green tire between the vulcanizing metallic mold and the annular inner mold body.

12. The rigid inner mold for forming the tire according to claim 6, wherein the Young's modulus Ea of the butting members is in a range of from 0.1 to 2.0 GPa.

13. A method of manufacturing a tire, comprising:
attaching sequentially a plurality of tire structure members onto the tire molding surface of the annular inner mold body of the rigid inner mold according to claim 7 such that the green tire is obtained;
putting the green tire into the vulcanizing metallic mold with the rigid inner mold; and
vulcanizing the green tire between the vulcanizing metallic mold and the annular inner mold body.

14. A method of manufacturing a tire, comprising:
attaching sequentially a plurality of tire structure members onto the tire molding surface of the annular inner mold body of the rigid inner mold according to claim 9 such that the green tire is obtained;
putting the green tire into the vulcanizing metallic mold with the rigid inner mold; and
vulcanizing the green tire between the vulcanizing metallic mold and the annular inner mold body.

15. A method of manufacturing a tire, comprising:
attaching sequentially a plurality of tire structure members onto the tire molding surface of the annular inner mold body of the rigid inner mold according to claim 12 such that the green tire is obtained;
putting the green tire into the vulcanizing metallic mold with the rigid inner mold; and
vulcanizing the green tire between the vulcanizing metallic mold and the annular inner mold body.

* * * * *